United States Patent
Hetzel et al.

(10) Patent No.: US 7,443,280 B2
(45) Date of Patent: Oct. 28, 2008

(54) ROLLING-CODE BASED PROCESS AND SYSTEM

(75) Inventors: Andreas Hetzel, Eislingen (DE); Andreas Miksch, Stuttgart (DE)

(73) Assignee: Daimler AG, Stuttgart (DE)

( * ) Notice: Subject to any disclaimer, the term of this patent is extended or adjusted under 35 U.S.C. 154(b) by 200 days.

(21) Appl. No.: 11/014,846

(22) Filed: Dec. 20, 2004

(65) Prior Publication Data

US 2005/0151667 A1 Jul. 14, 2005

(30) Foreign Application Priority Data

Dec. 20, 2003 (DE) ................................ 103 60 120

(51) Int. Cl.
  *B60R 25/00* (2006.01)
(52) U.S. Cl. .................................... 340/5.26; 307/10.2
(58) Field of Classification Search ............... 340/5.26, 340/5.64, 5.61, 5.8, 825.72, 825.69; 380/43, 380/262; 235/382; 307/10.2
  See application file for complete search history.

(56) References Cited

U.S. PATENT DOCUMENTS 4,928,098 A * 5/1990 Dannhaeuser .............. 340/5.26
5,229,648 A * 7/1993 Sues et al. .................. 307/10.2
5,596,317 A * 1/1997 Brinkmeyer et al. ....... 340/5.26
5,600,224 A   2/1997 Mody et al.
5,937,065 A * 8/1999 Simon et al. ................ 380/262

FOREIGN PATENT DOCUMENTS

| DE | 43 38 033 | 5/1995 |
| DE | 196 46 026 | 5/1998 |
| DE | 100 01 986 | 7/2001 |
| DE | 100 20 977 | 10/2001 |
| DE | 100 04 615 | 1/2002 |
| DE | 100 52 244 | 5/2002 |

* cited by examiner

*Primary Examiner*—Edwin C Holloway, III
(74) *Attorney, Agent, or Firm*—Crowell & Moring LLP

(57) ABSTRACT

In a rolling-code based process and system for the unambiguous identification of serial numbers in a data communication system, least two subscribers each have an identical serial number set. The process includes a) the first subscriber transmitting a first challenge with respect to a serial number from the serial number set to the second subscriber; b) subscriber responding the second subscriber by a first response corresponding to the first challenge; generating an identification signal for the second subscriber which unambiguously identifies the second subscriber with respect to the first subscriber if the first response corresponds to the serial number expected on the basis of the first challenge of the first subscriber.

13 Claims, 3 Drawing Sheets

ROLLING-CODE BASED PROCESS AND SYSTEM

BACKGROUND AND SUMMARY OF THE INVENTION

This application claims the priority of DE 103 60 120.1, filed Dec. 20, 2003, the disclosure of which is expressly incorporated by reference herein.

The invention relates to a rolling-code based process and system for the unambiguous identification of serial numbers in data communication between at least two subscribers to a data communication system.

Rolling-code based processes are currently used in access authorization systems, such as garage door opening systems, or in access and driving authorization systems in motor vehicles. U.S. Pat. No. 5,600,224, for example, discloses an access authorization system for a motor vehicle, which uses a rolling-code based challenge/response process for identifying an authorized vehicle subscriber. The system has an identification code for each transponder, a key sequence number and a rolling code. The rolling code, which is generated from a polynomial equation, prevents unauthorized access to the motor vehicle.

The present invention relates particularly to mutually unambiguous identification of different subscribers of a data communication system in a motor vehicle. Such subscribers are, for example, coupled with one another by way of one or more data lines of a bus system, with at least one subscriber, (for example, a control unit) operating as the master while the other subscribers operate as slaves during data communication via the bus.

To identify a subscriber, above-mentioned rolling-code process is used in connection with a generally known challenge/response procedure. Such challenge/response procedures are used particularly in keyless access and driving authorization systems in the motor vehicle, and in the so-called transponder technology. In the challenge/response process, a fist subscriber sends a challenge to a second subscriber, and the latter returns a corresponding response. The responding subscriber identifies itself, by a coded response signal or a coded response.

Subscribers of such a data communication system within a vehicle may be, for example, control units, various sensors (such as an outside temperature sensor) an engine radiator, etc. In this case, the problem sometimes arises that sensors or parts authorized for one motor vehicle are exchanged for unauthorized sensors or parts, so that requirements and legal standards are no longer completely observed or met. For example, exhaust gas directives can be evaded by the use of unauthorized sensors. Similarly, a radiator designed for a specific engine power can be exchanged for a less expensive radiator which does not satisfy the cooling capacity requirement of the vehicle motor. Moreover, after a one-time decoding of the response signal of the corresponding sensor or subscriber of the data communication, unauthorized sensors and parts, can be replaced, albeit at more or less large technical expenditures. If possible, the latter should be avoided.

One object of the present invention is to provide a method and apparatus by which only authorized subscribers of a data communication are unambiguously authenticated.

This and other objects and advantages are achieved by the method and apparatus according to the invention, in which rolling-code based process is provided for unambiguous identification of serial numbers in a data communication between at least two subscribers which have identical serial number sets, a first subscriber being, for example, an engine timing gear in a motor vehicle. The process according to the invention includes the steps of transmitting a first challenge with respect to a serial number from the serial number set from the first subscriber to a second subscriber; the second subscriber responding by a first response corresponding to the first challenge; generating an identification signal for the second subscriber which unambiguously identifies the second subscriber with respect to the first subscriber if the first response corresponds to the serial number expected on the basis of the first challenge of the first subscriber. The invention also provides a system for unambiguous authentication, using the process as described.

The process and the system according to the invention therefore ensure that only authorized subscribers to a data communication system are unambiguously identified by other authorized subscribers of the same data communication. This means that no unauthorized party can undesirably bring an unauthorized subscriber into the data communication.

Advantageously, each authorized subscriber recognizes whether a received serial number is a valid or an invalid serial and sends corresponding responses.

A response is advantageously sent only once by way of a data line. By varying the response, the reliability of the process and system according to the invention is enhanced; and an unauthorized party cannot circumvent the process or system in order to bring in unauthorized subscribers. The process and system according to the invention ensure, at very low hardware expenditures, that a subscriber or a specific sensor is not removed and replaced by an unauthorized replica. Thus, the system according to the invention is also distinguished by its less expensive implementation.

In a preferred further embodiment of the invention, the first challenge is randomly numbered, making it more difficult to circumvent the rolling-code based process according to the invention.

According to another preferred further embodiment, the first challenge corresponds to a coded position number of a serial number of the serial number set, so that only a single coded position number is transmitted by the engine timing gear or by the first subscriber, which position number relates to a serial number of the serial number set. An unauthorized subscriber, which has not stored the serial number set, can thus advantageously not relate such a decoded position number to a an authorized serial number. As a result, an unauthorized party cannot utilize an intercepted response to circumvent the process according to the invention, and replace an authorized subscriber by an unauthorized subscriber.

In a particularly advantageous variant, each serial number of the serial number set is used only once, making it more difficult to decode the process according to the invention, or to bring an unauthorized subscriber into the system.

It should be noted here that the term "only once" is not stochastic but has deterministic characteristics. Nevertheless, if a sufficiently large number of other serial numbers of the serial number set are situated between a specific serial number and the repetition of the specific serial number, each serial number appears to a subscriber to be virtually used "only once".

According to another preferred further embodiment, the first response forms the serial number corresponding to the first challenge, and the result of the analysis of the first challenge by the second subscriber is a position number. The first response of the second subscriber corresponds to the serial number which is stored at the position number of the serial number set of the second subscriber. It is an advantage of this further development that the second subscriber sends an authorized first response, specifically a corresponding serial number of the serial number set, only upon an authorized first challenge after an analysis.

In a particularly advantageous variant, a dummy challenge is provided which has a syntax and/or a value range identical to those of the first challenge. The dummy challenge is a coded dummy position number of a dummy serial number which does not exist within the serial number set. Because a challenge cannot be distinguished from a dummy challenge with respect to their syntax and/or their value range, an unauthorized party cannot differentiate between a dummy challenge and a challenge with respect to the syntax or the value range, making it still more difficult to circumvent the process according to the invention.

According to another preferred further embodiment, a dummy response has a syntax and/or a value range identical to that of the first response, also making it more difficult for an unauthorized party to circumvent the process according to the invention.

According to another preferred embodiment, subscriber only authorized subscribers are capable of differentiating between first challenges and dummy challenges. Thus, each authorized subscriber receiving a challenge knows whether the challenging subscriber is authorized.

According to another preferred further embodiment, after the first challenge has been transmitted from the first subscriber to the second subscriber, the latter analyzes the challenge, and the first response (sent by the second subscriber on the basis of the first challenge) is analyzed by the first subscriber. After analysis of the first challenge, the second subscriber knows whether the challenging first subscriber is authorized, after analyzing the first response, the first subscriber knows whether the responding second subscriber is authorized.

According to a further preferred embodiment, the first response to the first challenge and the dummy response to the dummy challenge are transmitted by the second subscriber to the engine timing gear or to the first subscriber. Since the syntax and/or value range of the first response and the dummy response are identical, it is more difficult for an unauthorized party to draw conclusions with respect to the process according to the invention on the basis of the intercepted responses of the second subscriber, and thereby circumvent the process.

According to another preferred embodiment, each subscriber is set to become inoperative, (particularly, mechanically destroyed) if it is removed from its position in the motor vehicle, so that, an unauthorized party cannot remove an authorized subscriber from the motor vehicle without destroying it. Only an undestroyed authorized subscriber could make it possible to draw conclusions with respect to circumvention possibilities concerning the process according to the invention. This is specifically what is prevented in this manner.

According to another embodiment, the second subscriber is a coated radiator for a motor vehicle. Basically, a subscriber can also be any sensor, such as an outside-temperature sensor of a motor vehicle.

Other objects, advantages and novel features of the present invention will become apparent from the following detailed description of the invention and when considered in conjunction with the accompanying drawings.

DETAILED DESCRIPTION OF THE DRAWINGS

Figure 1:
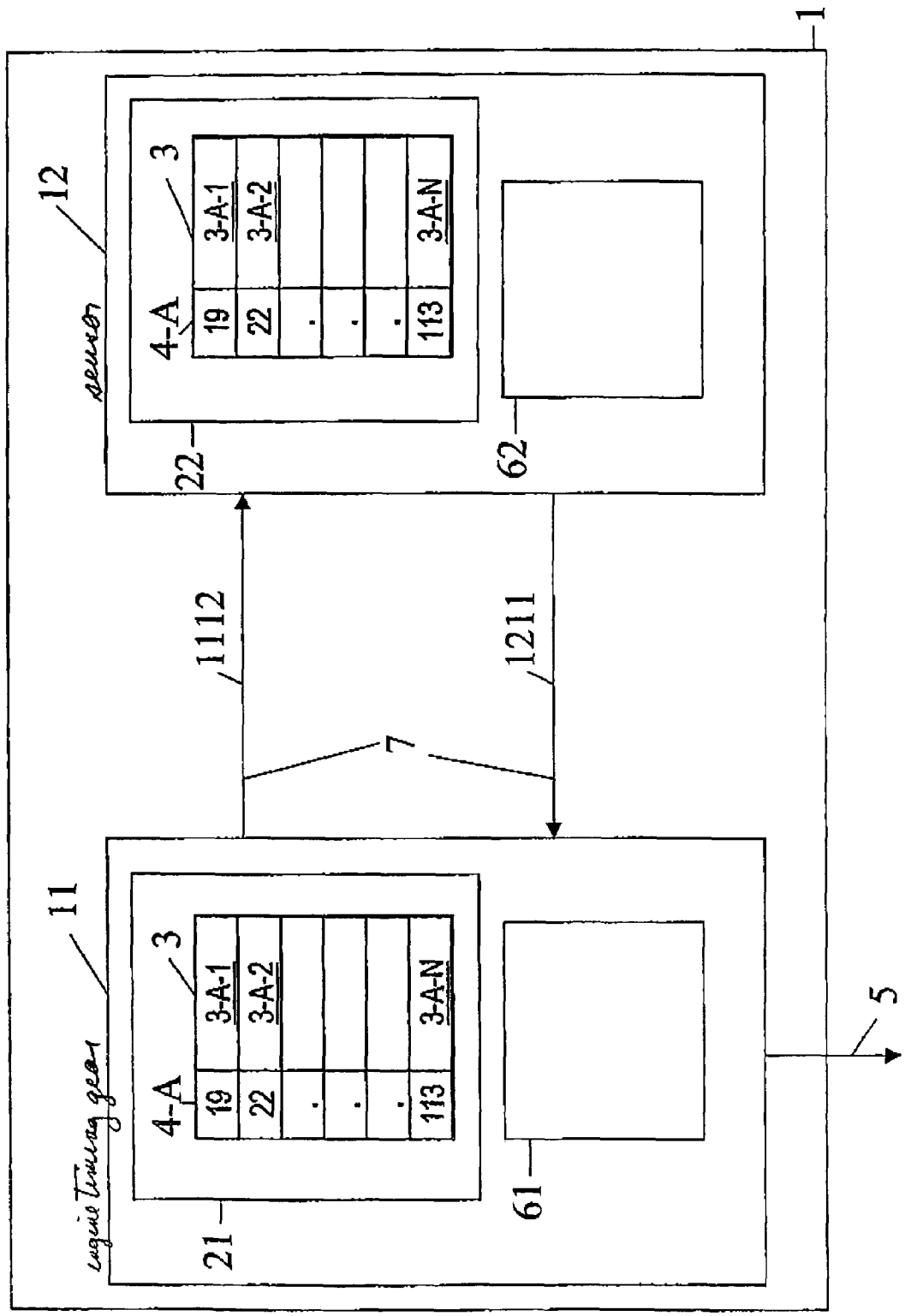
FIG. 1 is a block diagram of an arrangement according to the invention of a system based on a rolling code.

In all figures of the drawing, identical elements or elements having the same function were—unless otherwise indicated—provided with the same reference numbers.

FIG. 1 is a block diagram of a rolling-code based system according to the invention, which has at least two subscribers 11, 12 coupled by way of one or more bidirectionally operable data lines 7. A first subscriber 11 comprises as an engine timing gear 11 and a second subscriber 12 is an arbitrary sensor.

The engine timing gear 11 has a first storage device 21 and a first program-controlled device 61, preferably a microprocessor or a microcontroller. The first storage device 21 comprises a register in which a serial number set 3 is stored which has N serial numbers 3-A-1 to 3-A-N, which are randomly and arbitrarily numbered by position number 4-A. In the indicated example according to FIG. 1, the serial number 3-A-1, stored in the first storage device 21 of the first subscriber 11, has the position number 19.

The second subscriber 12 has a second storage device 22 and a second program-controlled device 62, preferably a microprocessor or a microcontroller. The second storage device has a serial number set 3 with serial numbers 3-A-1 to 3-A-1 that is identical to the serial number set of the first subscriber with identical serial numbers. Serial numbers 3-A-1 to 3-A-N are numbered by means of position numbers 4-A identically to serial numbers 3-A-1 to 3-A-N of the first subscriber 11.

The first subscriber 11 sends a challenge 1112 via the data line, to which the second subscriber 12 sends a corresponding response 1211 via the data line 7.

The first program-controlled device 61 of the first subscriber 11 generates the challenge 1112 and transmits it by way of the data line 7; it also analyzes the response 1211 of the second subscriber 12 corresponding to challenge 1112. Correspondingly, the second program-controlled device 62 of the second subscriber 12 generates the response 1211, and transmits it via the data line 7 back to the first subscriber 11.

Figure 2:
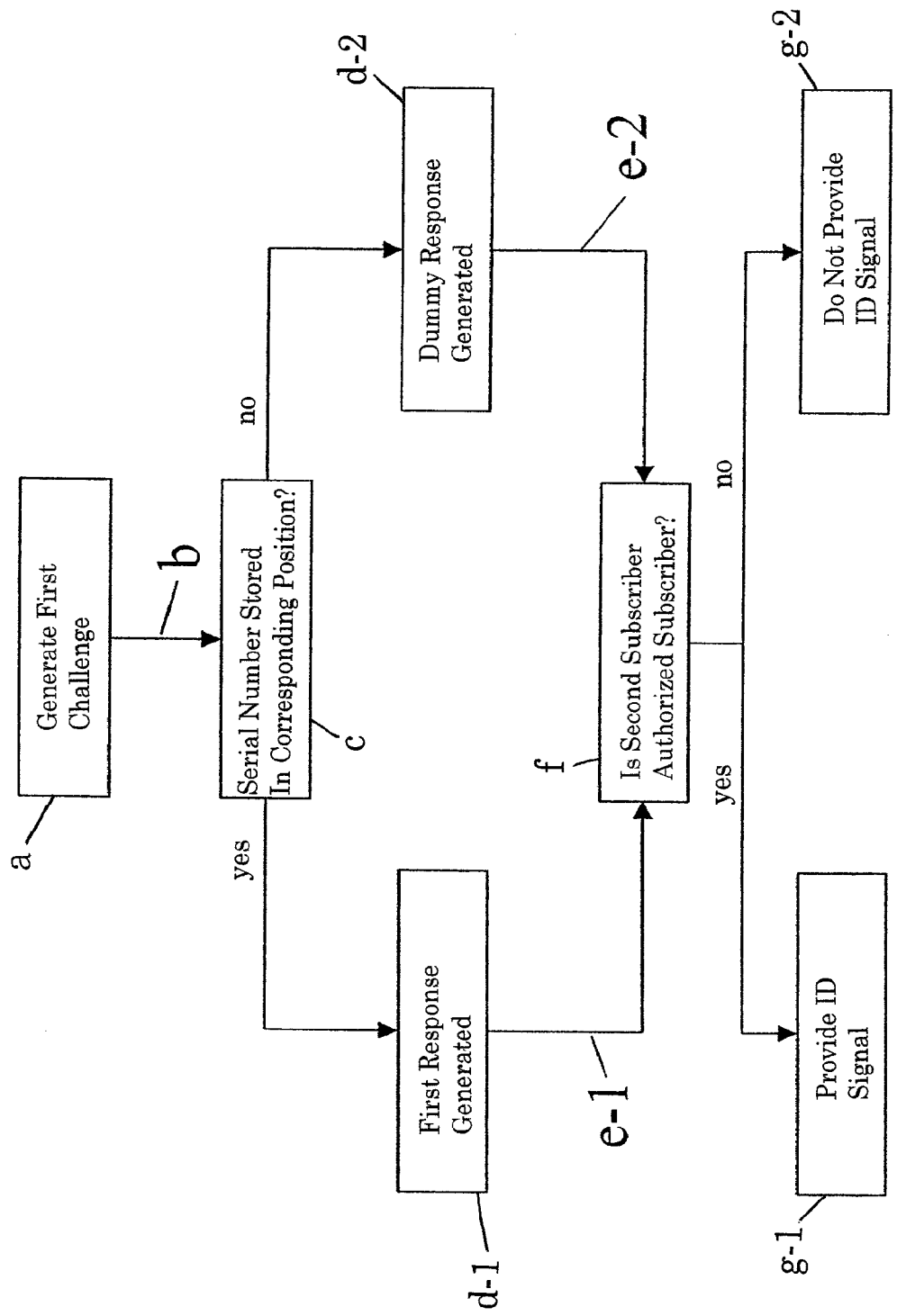
FIG. 2 is a flow chart of a rolling-code based process according to the invention in a first mode.

FIG. 2 is a flow chart of a first mode of the rolling-code based process according to the invention (including steps a-g), by which the function of the arrangement illustrated in FIG. 1 is described in detail.

Process Step a:

The program-controlled device 61 of the first subscriber 11 generates a first challenge 1112-A relative to a serial number 3-A, which is stored in the first storage device 21. Like the serial number 3-A, to which it relates, the first challenge 1112-A has the randomly numbered position number 4-A.

For example, the program-controlled device 61 generates a first challenge 1112-A-19 relative to the serial number 3-A-2, which is numbered, for example, with a position number 19.

Process Step b:

The program-controlled device 61 of the first subscriber 11 transmits the generated first challenge 1112-A by way of the bidirectionally operable data line 7 to the second subscriber 12.

Process Step c:

The second program-controlled device 62 of the second subscriber 12 analyzes the received first challenge 1112-A of the first subscriber 11. According to the above-introduced example, the second program-controlled device 62 compares whether a serial number 3-A is stored in the second storage device 22 of the second subscriber 12 at position number 19. If so, the second program-controlled device 62 will implement the process step d-1. If not, the second program-controlled device 62 will implement the process step d-2.

Process Step d-1:

Since a serial number 3-A is stored in the second storage device 22 of the second subscriber 12 at the decoded position number, according to the above-introduced example, at position number 19, a corresponding first response 1211-A is generated by the second program-controlled device 62.

Process Step e-1:

The first response 1211-A generated by the second program-controlled device 62 is transmitted by the second program-controlled device 62 of the second subscriber 12 by way of a bidirectionally operable data line 7 to the first subscriber 11.

Process Step d-2:

Since no serial number 3-A is stored in the second storage device 22 of the second subscriber 12 at the decoded position number 4-A, according to the above-introduced example, at position number 4-A, the second program-controlled device 62 will generate a dummy response 1211-B. The dummy response 1211-B differs from a first response 1211-A neither with respect to its syntax, nor with respect to its value range.

Process Step e-2

The generated dummy response 1211-B is transmitted by the program-controlled device 62 of the second subscriber 12 by way of a bidirectionally operable data line 7 to the first subscriber 11.

Process Step f:

The first program-controlled device 61 of the first subscriber 11 receives the response 1211 sent by the second subscriber 12. In process step f, the first program-controlled device 61 compares the received response 1211 with the serial number 3-to be expected on the basis of the sent challenge 1112. According to the above-introduced example, the sent response 1211-A-19 corresponds to the serial number 3-A-2 stored in the second storage device 22 of the second subscriber 12 at position number 19. If also the first subscriber 11 has stored the serial number 3-A-2 inside its first storage device 21 at position number 19, the two serial numbers, the serial number expected as a result of the first challenge 1112-A and the serial number 3-a transmitted by means of the first response 1211-A—are identical, and the second subscriber 12 is identified to the first subscriber 11 as an authorized subscriber.

If the second subscriber 12 is identified to the first subscriber 11 authorized subscriber, the program-controlled device 61 will carry out the process step g-1. However, if on the basis of its sent response 1211, the second subscriber is not identified to the first subscriber 11, the program-controlled device 61 of the first subscriber 11 will carry out process step g-2.

Process Step g-1:

The program-controlled device 61 of the first subscriber 11 provides an identification signal 5 for the second subscriber 12.

Process Step g-2:

The program-controlled device 61 of the first subscriber 11 provides no identification signal 5 for the second subscriber 12.

Since, in this first mode of the rolling-code based process, the first subscriber 11 sends only first challenges 1112-A to the second subscriber 12, the process step d-2, which is carried out by the second subscriber 12, is required only if another subscriber of the overall system initializes an identification of the second subscriber 12.

Figure 3:
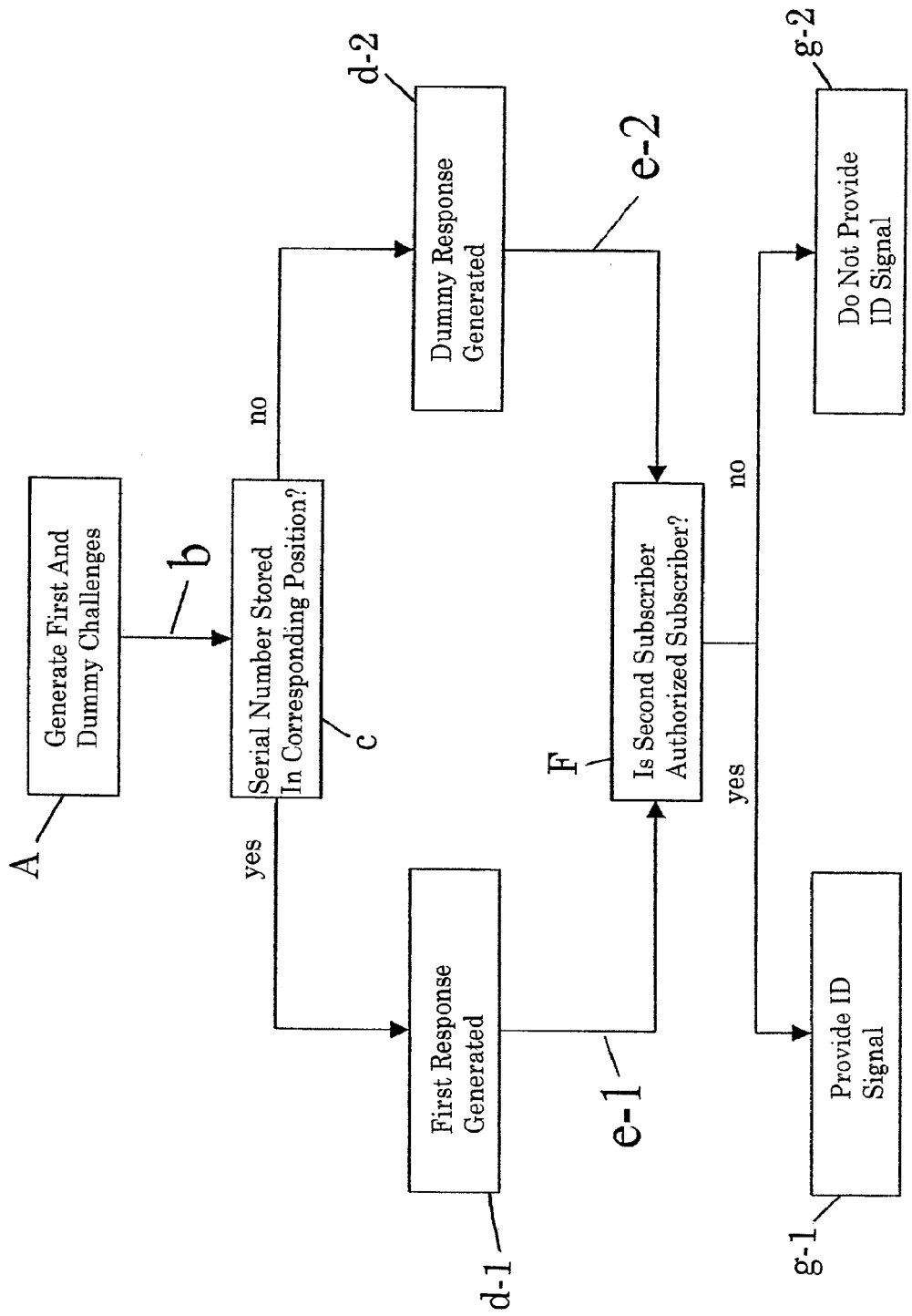
FIG. 3 is a flow chart of a rolling-code based process according to the invention in a second mode.

FIG. 3 is a flow chart of a second mode of the rolling-code based process according to the invention which differs from the first mode (FIG. 2), essentially by the process steps A and F. The process steps marked by small letters are essentially the same as those in FIG. 2.

Process Step A:

In an arbitrary sequence, the program-controlled device 61 of the first subscriber 11 generates first challenges 1112-A and dummy challenges 1112-B, which are transmitted in the generated sequence to the second subscriber 12 (process step b).

Process Step F:

In process step F, the program-controlled device 61 of the first subscriber 11 decides whether the second subscriber 12 is authorized subscriber or unauthorized subscriber. If the first subscriber 11 has transmitted a first challenge 1112-A to the second subscriber 12 and the first subscriber 11 receives a first response 1211-A, the program-controlled device 61 of the first subscriber 11 decides that the second subscriber 12 is authorized. (Compare the first mode, FIG. 2.)

However, if the subscriber 11 sends a dummy challenge 1112-B and the first subscriber 11 receives a dummy response 1211-B from the second subscriber 12, the program-controlled device 61 of the first subscriber 11 decides that the second subscriber 12 is authorized.

If the first subscriber 11 sends a first challenge 1112-A and receives a dummy response 1211-B from the second subscriber 12, the program-controlled device 61 of the first subscriber 11 decides that the second subscriber 12 is unauthorized.

If the first subscriber 11 sends a dummy challenge 1211-A to the second subscriber 12 and receives a first response 1211-A from the second subscriber 12, the program-controlled device 61 of the first subscriber decides that the second subscriber 12 is unauthorized.

Although the present invention was explained above by means of preferred embodiments, it is not limited thereto but can be modified in multiple fashions. For example, the number of subscribers can be modified. That is, although two subscribers are used in the above-described embodiments, the number of subscribers exchanging data by way of one or more data line(s) is more or less arbitrary.

Furthermore, the rolling-code based system according to the invention can be modified in that the master does not necessarily have to be an engine timing gear: arbitrary subscribers or sensors can exchange data by way of one more data line(s). Such sensors may, for example, be hydraulic sensors, pressure sensors or any other sensors which can be installed in a motor vehicle. Arbitrary control units can be used as masters.

The foregoing disclosure has been set forth merely to illustrate the invention and is not intended to be limiting. Since modifications of the disclosed embodiments incorporating the spirit and substance of he invention may occur to persons skilled in the art, the invention should be construed to include everything within the scope of the appended claims and equivalents thereof.

What is claimed is:

1. A rolling-code based process for the unambiguous identification of serial numbers in a data communication over a data communication system within a vehicle between at least first and second subscribers which have identical serial number sets stored in respective storage devices, said process comprising:

generating a first challenge relative to a serial number and transmitting, on at least one data line of a bus system within the vehicle, the first challenge from the first subscriber to the second subscriber;

analyzing the first challenge received from the first subscriber to determine whether the same serial number is stored at a corresponding position in the second subscriber;

generating a corresponding first response and transmitting, on the at least one data line, the first response as an output from the second subscriber to the first subscriber when the same serial number is stored at said corresponding position in the second subscriber;

generating a dummy response and transmitting, on the at least one data line, the dummy response as the output from the second subscriber to the first subscriber when the same serial number is not stored at said corresponding position in the second subscriber;

comparing the output from the second subscriber to determine if a serial number expected as a result of the first challenge and the output from the second subscriber are identical;

outputting an identification signal from the first subscriber when the expected serial number and the output are the same; and outputting no identification signal otherwise.

2. The process according to claim 1, wherein the first challenge is arbitrarily numbered in a storage device.

3. The process according to claim 2, wherein the first challenge corresponds to a coded position number of a serial number of a serial number set.

4. The process according to claim 3, wherein each serial number of the serial number sets is used only once.

5. The process according to claim 4, wherein the first response is a serial number corresponding to the first challenge.

6. The process according to claim 5, wherein a dummy challenge having at least one of a syntax and a value range that is identical to those of the first challenge is provided, and the dummy challenge forms a coded dummy position number of a dummy serial number which does not exist within the serial number sets.

7. The process according to claim 5, wherein the dummy response has at least one of a syntax and a value range that is identical to those of the first response.

8. The process according to claim 6, wherein each subscriber is capable of differentiating between the first challenge and the dummy challenge.

9. The process according to claim 6, wherein, after the first subscriber transmits the first challenge, the second subscriber receives and analyzes the first challenge, and, after the second subscriber transmits the first response, the first subscriber receives and analyzes the first response.

10. The process according to claim 6, wherein, after receiving the first challenge, the first response is transmitted from the second subscriber to the first subscriber, and, after receiving the dummy challenge, the dummy response is transmitted from the second subscriber to the first subscriber.

11. The process according to claim 6, wherein each subscriber has a defined position in a motor vehicle, and a subscriber is rendered inoperable if said subscriber is removed from its defined position.

12. A rolling-code based system for the unambiguous identification of serial numbers in a data communication over a data communication system within a vehicle between at least two subscribers which have identical serial number sets stored in respective storage devices that performs the rolling-code based process of claim 1.

13. The system according to claim 12, wherein the second subscriber is a coated radiator for a motor vehicle.

* * * * *